United States Patent

[11] 3,615,230

| [72] | Inventors | Rudolf Barnick;<br>Detlev Siemon, both of<br>Überlingen/Bodensee, Germany |
|---|---|---|
| [21] | Appl. No. | 689,516 |
| [22] | Filed | Dec. 11, 1967 |
| [45] | Patented | Oct. 26, 1971 |
| [73] | Assignee | Bodenseewerk Perkin-Elmer & Co. GmbH<br>Überlingen/Bodensee, Germany |
| [32] | Priority | Dec. 15, 1966 |
| [33] | | Germany |
| [31] | | B 90 305 |

[54] DEVICE FOR AUTOMATICALLY CARRYING OUT CHEMICAL ANALYSES
8 Claims, 3 Drawing Figs.

[52] U.S. Cl. ..................................................... 23/253 R,
141/130
[51] Int. Cl. ....................................................... B65b 43/60
[50] Field of Search............................................ 23/253,
230, 253 A, 259; 141/130, 88, 1; 73/423 A, 425.4

[56] References Cited
UNITED STATES PATENTS

| 2,894,542 | 7/1959 | Alm............................. | 141/130 |
| 3,178,266 | 4/1965 | Anthon........................ | 23/253 |
| 3,487,862 | 1/1970 | Soderblom................... | 141/130 X |
| 3,501,273 | 3/1970 | Agner........................... | 23/253 |

*Primary Examiner*—Morris O. Wolk
*Assistant Examiner*—R. M. Reese
*Attorney*—Edward R. Hyde, Jr.

ABSTRACT: A method and apparatus for automatically carrying out chemical analyses. The apparatus comprises a series of sample holders, a dosing pump, a transporting device for guiding the sample holders past the dosing pump, a plurality of reaction vessels associated with each sample holder, and control means for moving the dosing pump relative to the holders and for providing for withdrawal of an unmeasured quantity of sample from the sample holders and for dispensing this sample quantity in smaller measured quantities into associated reaction vessels.

PATENTED OCT 26 1971 3,615,230

INVENTOR.
RUDOLF BARNICK
BY DETLEV SIEMON

ATTORNEY

DEVICE FOR AUTOMATICALLY CARRYING OUT CHEMICAL ANALYSES

The present invention relates to a method and apparatus for automatically performing chemical analyses. Apparatus of this general type are, for instance, described in U.S. Pat No. 3,192,968 and 3,193,359.

In the known arrangement according to the U.S. Pat. No. 3,192,968 there is provided a turntable with a series of sample vessels positioned around the table in a circular configuration and into which a sample is injected in undosed quantities. Through use of a dosing pump, a defined quantity is delivered into each reaction vessel. These reaction vessels are also arranged on the turntable in a circle. The turntable rotates relative to the stationary dosing pump for providing that the sample vessels and the reaction vessels one after the other enter into the area of the dosing pump. Another pump is also provided whereby a sample may be transported from one vessel each of a first turntable into a vessel of another turntable.

In the arrangement according to the U.S. Pat. No. 3,193,359 a magazine comprising sample and reaction vessels is advanced stepwise and rectilinearly by a chain, and in so advancing, the individual vessels are successfully guided past pumps. In this arrangement, four vessels respectively are aligned in a direction normal to the direction of feed. One vessel serves as a sample vessel into which the sample is injected in undosed quantity. From this sample vessel a dosed quantity of sample is delivered into a second of the vessels by means of a combined sample and reagent pump. A precipitation is effected in the second vessel. After termination of the precipitation, the liquid is delivered into a third vessel by another pump offset with respect to the dosing pump in the direction of movement of the magazine the third vessel is closed by a filter at a bottom thereof. The liquid, freed of the precipitate, flows through the filter into a fourth vessel which is arranged at a slightly lower location. The liquid is then sucked off from this fourth vessel for instance, for further reactions or investigations. Thus, this arrangement involves the carrying out of the various steps of precipitation and filtering, and of a preparing process with one and the same sample successively in the different vessels.

Motor-driven dosing pumps are known, wherein a motor moves a pump piston, the motor being connected to a voltage source by a control switch for a predetermined period of time. An arrangement of this type is disclosed in German Pat. No. DAS 1,168,674. The dosing accuracy depends largely on how quickly the motor starts and how quickly it is decelerated after termination of the dosing. Compressed air actuated dosing pumps are also known as discussed in U.S. Pat. No. 3,192,968, wherein the dosing pump piston is connected with a stroke piston. The stroke piston is controlled on either side thereof and is movable up and down by compressed air. With this arrangement, the piston stroke is defined by a stop in the form of a micrometer screw. With these prior art dosing pumps a more or less accurately dosed sample volume is withdrawn and this entire dosed quantity is then dispensed in one operation.

Automatic titrating devices with a piston burette are also known wherein the burette piston is controllable by a stepping motor. For this purpose, the burette piston is connected with a nut which is guided on a threaded spindle so as to be nonrotatable. This threaded spindle is driven by a stepping motor, whereby it is possible to dose the received and delivered sample quantity by the number of pulses supplied to the stepping motor.

It is an object of the present invention to provide a device of the type indicated such that several different analyses may be carried out simultaneously.

In accordance with features of this invention, a dosing pump having a piston is driven by a stepping motor and is insertable in a sample vessel by a control means for withdrawal of an unmeasured quantity and for successive delivery of smaller dosed quantities of the withdrawn sample into different reaction vessels. Thus, an arrangement is provided which does not deliver the withdrawn sample in a single dosed quantity as a whole, as have prior art automatic analytical devices, but rather a pump is provided which is adapted to deliver a withdrawn unmeasured sample quantity in several accurately dosed quantities each of which dosed quantities can differ in a manner similar to the known piston burettes of the aforesaid titrating device. By using such a pump for the sample an unmeasured sample quantity is withdrawn from the sample vessel and is distributed onto several reaction vessels in accurately dosed quantities. In this plurality of reaction vessels, different reactions may then be carried out simultaneously. Thus, for instance, different reagents may be added to the different quantities of sample liquid in the reaction vessels to analyze the sample simultaneously as to different components thereof. Thus in view of the features of this invention, it is no longer necessary to carry out, in the reaction vessel associated with a sample vessel and with one single sample quantity, the different steps of one single reaction, such as the separation of a component by precipitation and filtering.

The present invention may be realized in one embodiment with a turntable transport device having arranged therearound the vessels in several series, the sample vessel and the associated reaction vessels being respectively arranged in a radial series and the dosing pump arranged for radial and vertical motion with respect to the turntable.

Provision should be made that sample substance from the one sample vessel does not enter into and contaminate the next following sample. In the prior art arrangements this is ensured by a dosing pump for the sample which simultaneously serves as reagent pump, after each dosing of sample after a changeover action, the reagent is forced into the reaction vessel by the dosing pump and the sampling tube. This arrangement is disadvantageous for several reasons. The reagent must be added immediately at the same position of the turntable at which the sample dosing takes place. It may, however, be desirable after the dosing to let the sample run, for instance, in a water bath for a period of time to permit the reaction to take place at a well-defined temperature. Also, this method for cleaning the dosing pump, is generally not applicable with the arrangement according to the present invention since a dosing is effected with one pump by delivery of dosed quantities into several reaction vessels, in which different reagents are combined with the samples. In another known arrangement for avoiding contamination in such devices the sampling tube is immersed at intervals in a washing liquid such as distilled water. However the traces of the preceding sample can be eliminated only incompletely. Further, this method does not take into account that distilled water itself with respect to the analysis to be carried out also represents a "contamination", and is frequently a contaminant in a stronger degree than possible residues of the previously dosed sample. If, for instance, the proportion $c$ of a component X in the sample shall be analyzed, then residues of the preceding sample, where the component X was present with a proportion $c'$ similar to $c$, will frequently result in a smaller falsification of the quantitative analytical result than distilled water in which the component X is present with the concentration zero. It may, therefore, be possibly advantageous to fully do without a rinsing with a water liquid.

An advantageous construction in accordance with another feature of this invention results when the dosing pump, prior to each sample dosing, delivers sample withdrawn by a pump from the sample vessel into a waste vessel. Thus, a rinsing is then effected with the subsequently dosed and analyzed sample liquid itself. The waste vessel is provided in one embodiment by a drain extending around the turntable.

A pump in accordance with one embodiment of the invention includes a piston and a stepping motor arranged coaxially to the piston for driving a threaded spindle which engages a nut connected with the piston and, guided so as to be nonrotatable. The piston cylinder is formed of glass and the piston of a smooth elastic plastic material, preferably polytetrafluorethylene and the cylinder is closed by a plug in which there is arranged a capillary tube of chrome steel for admitting and discharging the liquid. When the piston is advanced to the end of the cylinder, then the dead volume, and thus the not dischargeable volume of the dosing pump is defined only by the capillary tube and may be kept very small, for instance, below 5 microliters for a capillary tube of 0.3 mm. inside width. With the aforementioned selection of the materials regardless of the different expansion coefficients, the tightness of the piston is always ensured when being fitted somewhat tight at room temperature. Then, at 59° F. a good seal is still ensured. At higher temperatures a certain low movability of the piston will result which, however, does not affect the dosing due to the drive of the stepping motor. Since the plastics material is elastic, a possible fracture of the glass cylinder is avoided. An important advantage of the selected materials, however, is that no falsification of the sample and of an analysis occurs as by abrasion as would be the case, say, when using metal parts. An embodiment of the present invention is presented in the drawings and is described as follows:

Figure 1:
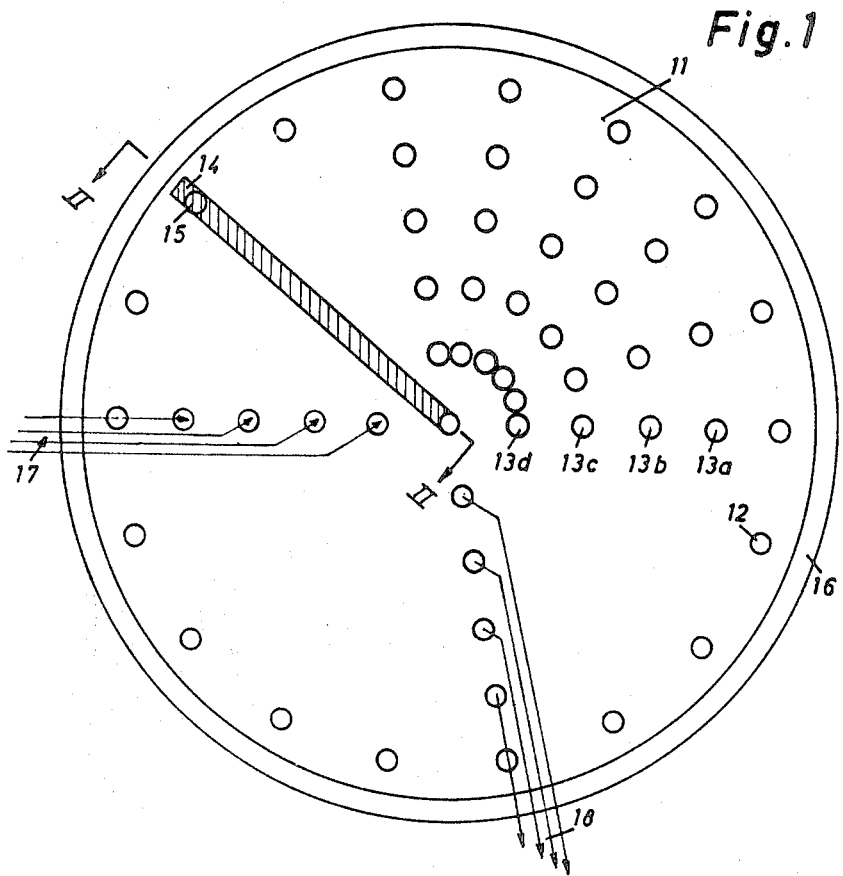
FIG. 1 illustrates schematically a top view of a device according to the present invention.

Referring now to FIGURE 1, a turntable 11 which is rotated stepwise at equal intervals of time includes a series of sample vessels 12 arranged along the circumference thereof. With each step, a rotation is always effected by an angular distance of two contiguous sample vessels 12. Each sample vessel 12 has associated therewith four reaction vessels 13 $a$, $b$, $c$, and $d$. These four reaction vessels are arranged in a straight line extending radially inwardly of the associated sample vessel 12.

Reference numeral 14 designates a mechanism by means of which a dosing pump 15 is radially and vertically movable according to a program. The manner in which such a mechanism may be designed, is within the scope of action of a person being versed in this art and is therefore not illustrated in further detail. Around the turntable there is arranged a waste drain 16. At a station 17 means are provided to add different reagents to the samples in the reaction vessels 13 $a$–$d$. At a station 18 the samples from the vessels 13 $a$–$d$ are fed into a photometer or the like.

Figure 3:
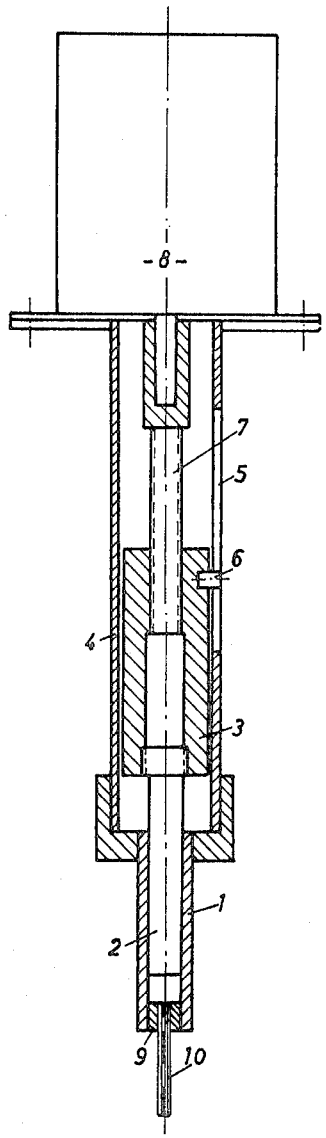

The sample pump is more fully illustrated in FIG. 3. A cylinder which is provided by a calibrated glass tube 1, has sliding therein a piston 2 of polytetrafluorethylene (Teflon). The piston 2 is connected with a nut 3 which is guided in non-rotatable manner in a housing 4 by means of a guide notch 5 in which a pin 6 engages. The nut 3 is mounted on a threaded spindle 7 which is driven by a stepping motor 8. The cylinder 1 is connected with the housing 4. Housing 4, piston 2 and cylinder 1, nut 3, spindle 7 and stepping motor 8 are all arranged coaxially. The cylinder 1 is closed by a plug 9 in which there is arranged a capillary tube 10 for taking in or discharging the liquid to be dosed.

Figure 2:
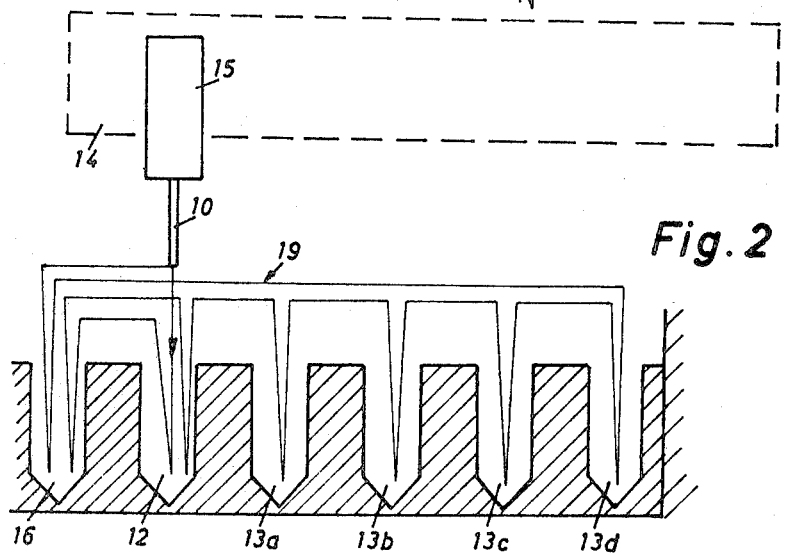
FIG. 2 illustrates schematically a partial section along line II—II of FIGURE 1; and, FIG. 3 illustrates a section through the sample pump.

FIG. 2 illustrates the manner in which the pump is controlled, the lines 19 showing the path of the end of the capillary tube 10. In a preceding dosing operation, the pump 15 has forced the residue of the pump filling which has not been distributed onto the reaction vessels, into the waste drain 16. It is still contaminated to a certain extent with the preceding sample. Therefore, the pump 15 with the sampling capillary tube 10 is first immersed into the sample in vessel 12, sucks in a certain amount of sample liquid and also forces the same into the waste drain. Thus, it has been rinsed with sample liquid of the samples to be analyzed now. Residues of this "rinsing liquid" are not disturbing anymore, since this very liquid is thereafter sucked in for dosing and is distributed onto the vessels 13 $a$–$d$ in defined, possibly different, quantities. For this purpose the sampling capillary tube is first immersed again into the sample vessel 12, the pump takes in a substantially undosed, but sufficient amount of sample liquid. Thereafter, the sampling capillary tube 10 is lowered successively into the vessels 13 $a$–$d$. In each vessel 13 $a$–$d$ the capillary tube delivers a defined quantity of sample from the same pump filling. The quantity is defined by the number of pulses which are supplied to the stepping motor 8 in the respective position and is defined with relatively great accuracy. By the pulse numbers it may be selected so as to be different for the different reaction vessels by simple means when this is desired. After the dosing in the last reaction vessel 13$d$ the pump 15 returns to the waste drain and expels the residue of the pump filling not being dosed. Now, the turntable steps on by one step so that the next sample vessel with the associated reaction vessels enters into the area of the pump 15. Then, the cycle as hereinbefore described is repeated. Since the dosing or sample quantity measurement does not take place with the pump loading but rather with the delivery, then one pump-filling sample may be dosed into several reaction vessels. This, of course, may be accomplished more quickly than in prior arrangements wherein the dosing takes place upon loading the pump and the pump for each dosed injection had to be returned to the sample vessel.

While we have illustrated and described a particular embodiment of our invention, it will be understood that various modifications may be made therein without departing from the spirit of the invention and the scope of the appended claims.

We claim:

1. A device for automatically carrying out chemical analyses comprising:
   a transport means including a support body;
   a plurality of sample vessels positioned on the support body;
   a plurality of reaction vessels associated with each sample vessel and positioned on the support body;
   a dosing-pump station having a pump positioned thereat;
   said transport means adapted for transporting successively positioned sample vessels and associated reaction vessels to said pump station; and,
   pump-actuating means for causing said pump to withdraw a quantity of sample material from a sample vessel and to dispense a plurality of measured smaller quantities of the withdrawn sample quantity into reaction vessels associated with said sample vessel.

2. The device as claimed in claim 1 wherein said transport body comprises a rotatable turntable, said sample vessels are arranged in a circle on said turntable, said associated reaction vessels are positioned along a radial line of said turntable and said pump-actuating means is adapted for moving said dosing pump radially and vertically with respect to said turntable.

3. The device as claimed in claim 1 including a waste vessel, and said pump control means is adapted for causing said pump to withdraw a sample quantity and discharge this quantity into said waste vessel for cleaning said pump.

4. The device as claimed in claim 3, wherein said waste vessel is provided by a drain extending around said turntable.

5. The device of claim 1 wherein said dosing pump includes a piston positioned in a cylinder and means including a stepping motor coupled to said piston for operating said piston to cause displacement of said piston.

6. A dosing pump as claimed in claim 5 wherein said stepping motor is arranged coaxially to said piston, said pump further including a threaded spindle coupled to said motor and rotatably driven thereby, a coupling means engaging said spindle and coupled to said piston, and a guide means for restricting rotation of said coupling.

7. A dosing pump as claimed in claim 6 wherein said cylinder is formed of glass and said piston is formed of smooth elastic plastic material.

8. A dosing pump as claimed in claim 7 including a plug closure for said cylinder and a capillary tube positioned in said plug closure for admitting and discharging a liquid from said cylinder.

* * * * *